Jan. 23, 1968
D. W. BAUMGARTNER
3,364,825
APPARATUS FOR AND METHOD OF HEAT SEALING
TWO-PIECE PAPER CUPS
Filed June 9, 1965
4 Sheets-Sheet 1
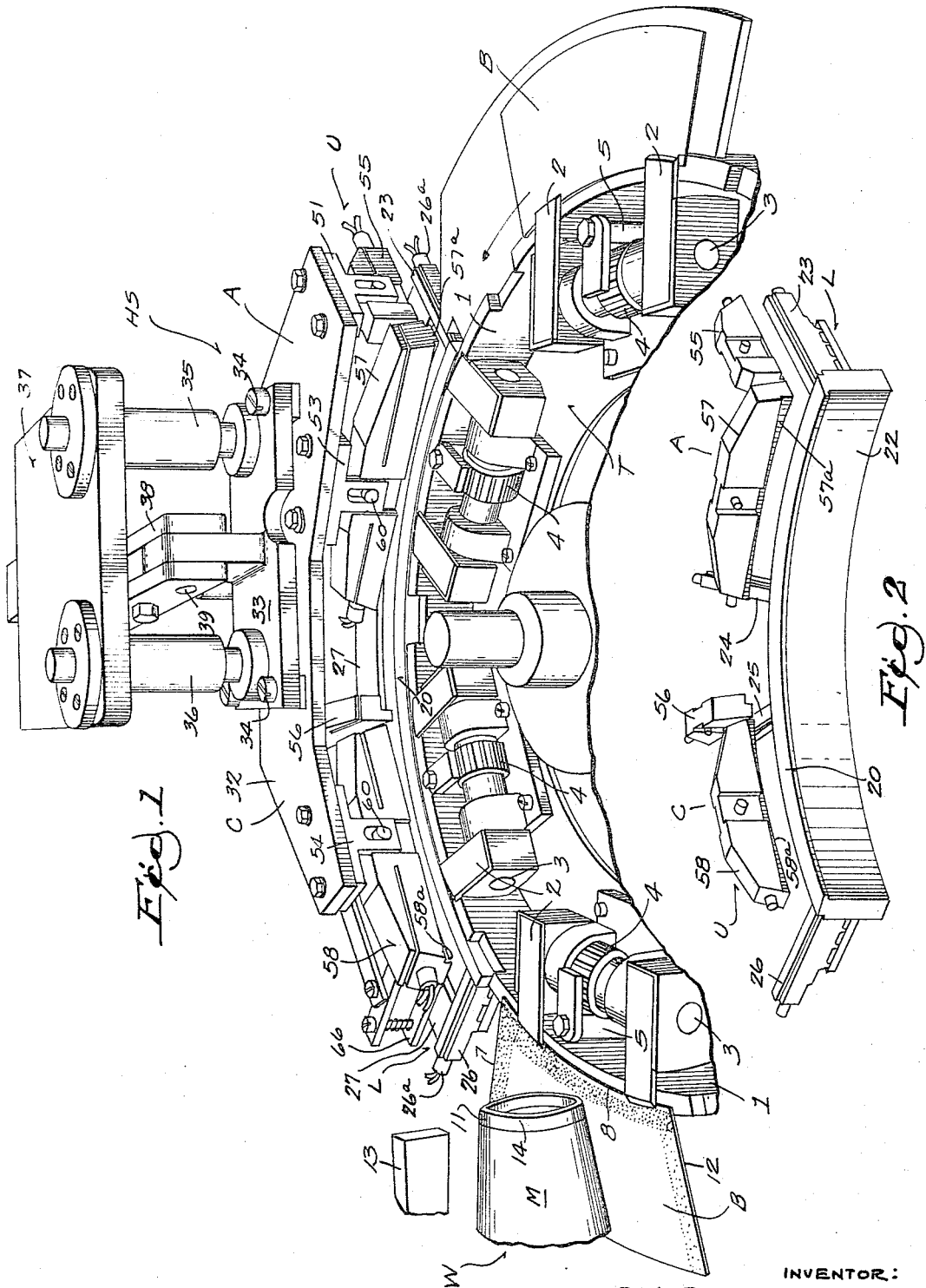
INVENTOR:
D.W. BAUMGARTNER
BY: James E. Nilles
ATTORNEY

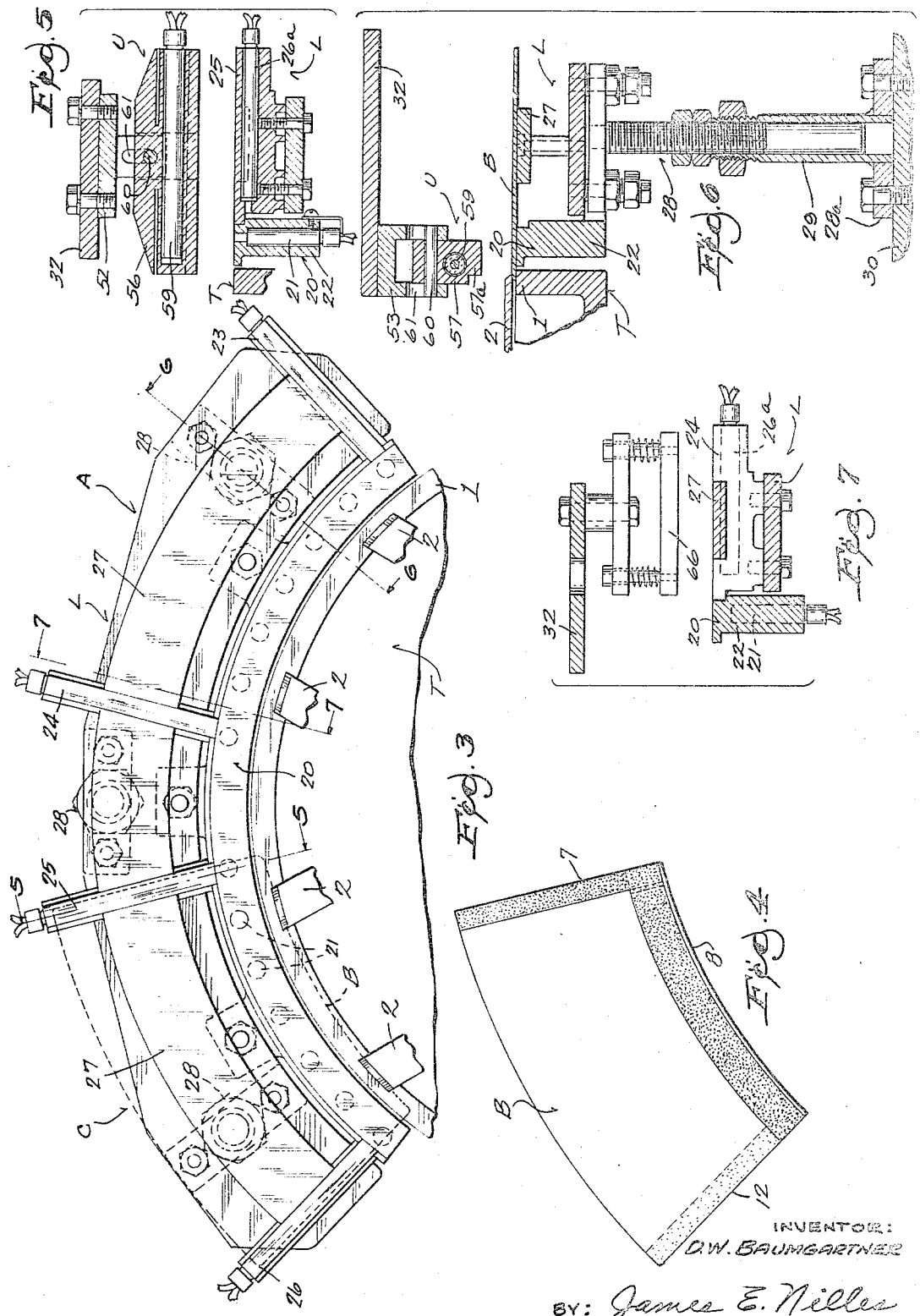

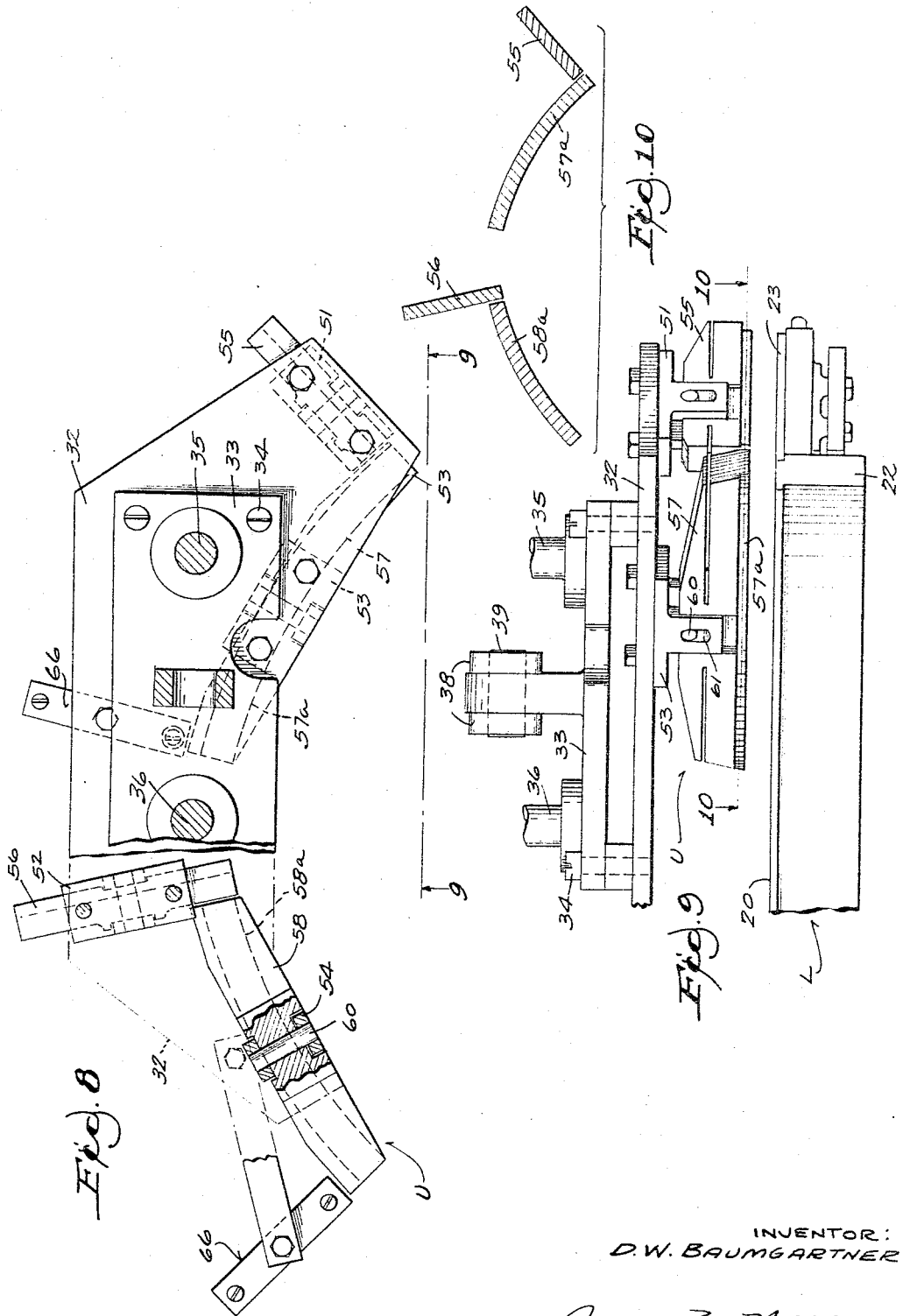

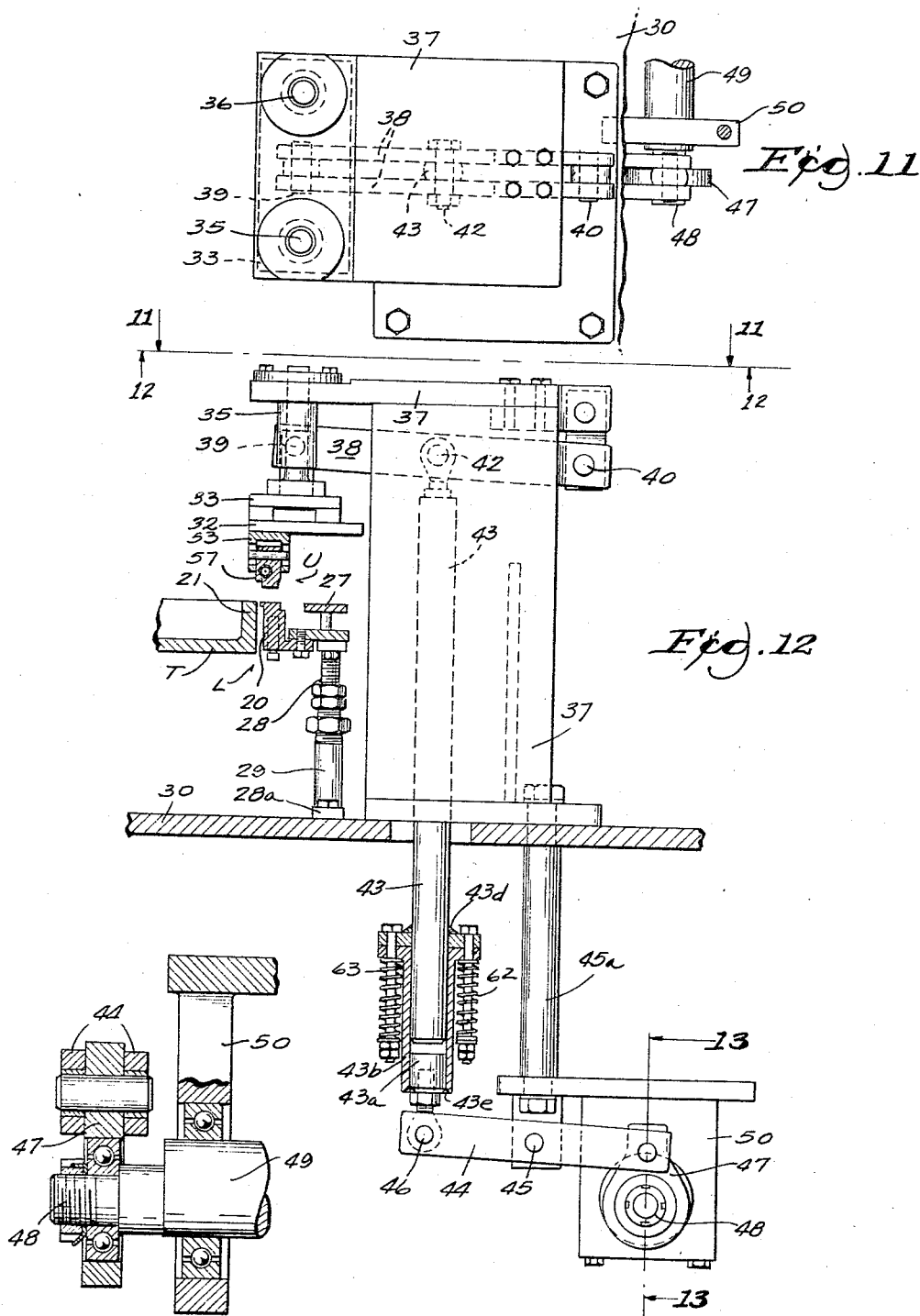

United States Patent Office 3,364,825
Patented Jan. 23, 1968

3,364,825
APPARATUS FOR AND METHOD OF HEAT SEALING TWO-PIECE PAPER CUPS
Donald W. Baumgartner, 4740 N. Bartlett, Milwaukee, Wis. 53211
Filed June 9, 1965, Ser. No. 462,503
14 Claims. (Cl. 93—36)

ABSTRACT OF THE DISCLOSURE

Apparatus and method of heat sealing paper cups coated with thermoplastic material, the cup blank being heated, in the areas where the seal is to be made, prior to wrapping the blank around the forming mandrel. The heating is done in two separate stages and the blank is moved from one heating location to another between the applications of heat.

---

This invention relates generally to two-piece, flat-bottom, paper-up making machinery. More particularly, the invention relates to apparatus for and a method of heat sealing such cups which are at least coated with polyethylene or other heat sealable material.

This invention finds particular utility in heat sealing two-piece paper cups which are coated with thermoplastic or heat sealable material such as polyethylene, commonly referred to as "poly." Heretofore, it has been extremely difficult if not impossible to heat seal cups made or coated with such material, particularly in a high-speed machine and without excessive maintenance and very complicated mechanism. One difficulty was that the coating of poly would "stick" or peel off when heated, completely precluding a satisfactory heat seal operation.

Another example of a prior art attempt to heat seal poly-coated, two-piece, flat-bottom cups is U.S. Patent No. 3,134,307, issued on May 26, 1964, to D. B. Loeser and entitled "Heat Sealing Device for Side Seams of Paper Cups," said patent being assigned to the assignee of the present application. While that device did work satisfactorily, it required a considerable amount of complex mechanism which was not only costly but required much maintenance; in addition, there was a limit to the production rate of such a machine due to the time required to alternately swing the seam heating bar and then the cooling bar into position and against the seam.

The present invention provides both apparatus for and a method of heat sealing paper cups coated with poly by the application of heat to the blank in two separate stages of short duration and before the blank is applied to the forming mandrel. The amount of heat applied during these stages will vary somewhat, depending on the density of the poly used, but a satisfactory range is from 350 to 600 degrees Fahrenheit, lower density poly sealing in a wider or less critical range of temperatures, and being generally more readily sealable and requiring less heat. The first stage of heat acts to bring the temperature of the poly up to about one-half of the required or proper temperature, and the second stage brings the temperature up to the proper degree before wrapping of the blank and application of pressure to the joint. The blank is heated on both sides, and an excessive amount of heat is not applied all at once. As a result of the present invention, neither the poly nor in ink on the blank is picked off or sublimed, and a good heat sealed joint is provided.

These and other objects and advantages of the present invention will appear hereinafter as this disclosure progresses, reference being had to the accompanying drawings, in which:

FIGURE 1 is a fragmentary, perspective view of a machine embodying the present invention, and showing the station where the side wall blank is heated in two stages;

FIGURE 2 is a fragmentary, perspective view of the heater assemblies which are shown in FIGURE 1, but on a slightly reduced scale;

FIGURE 3 is a plan view of the lower heater shown in FIGURE 2, but on an enlarged scale;

FIGURE 4 shows a paper blank used with the present invention; with the heat pattern indicated thereon;

FIGURE 5 is a sectional view taken along line 5—5 in FIGURE 3;

FIGURE 6 is a sectional view taken along line 6—6 in FIGURE 3;

FIGURE 7 is a sectional view taken along line 7—7 in FIGURE 3;

FIGURE 8 is a plan view of the upper heater assembly as shown in FIGURE 1, certain parts being shown as removed, broken away, or in section;

FIGURE 9 is a fragmentary, elevational view taken along line 9—9 in FIGURE 8;

FIGURE 10 is a sectional view through the heaters and taken along line 10—10 in FIGURE 9;

FIGURE 11 is a fragmentary plan view of a portion of the station shown in FIGURE 1, certain parts being removed or broken away for clarity;

FIGURE 12 is a side elevational view of the station as shown in FIGURE 11 and taken along the line 12—12 in that view, certain parts being shown in section for clarity; and FIGURE 13 is a fragmentary, sectional view taken on line 13—13 in FIGURE 12.

Referring in greater detail to the drawings, the apparatus includes a rotatable table T having a horizontal rim 1 adjacent its periphery and a series of circumferentially spaced pairs of gripper fingers 2 which are oscillated about their pivot shaft 3 through a pinion 4 which in turn is oscillated by a vertically extending rack 5. Conventional mechanism (not shown) located under the table reciprocates the rack in timed relationship with rotation of the table. The arrangement is such that the fingers 2 are raised when located at the right-hand position (as viewed in FIGURE 1) so as to receive a cup side wall blank B from conventional feeding means (not shown). After the bottom edge of the blank has been inserted between the rim 1 and the raised fingers 2, the fingers are snapped shut in a downward direction, gripping the blank tightly against the rim. The table then rotates the blank, as indicated by the curvilinear arrow in FIGURE 1, to the heat sealing station, indicated generally by references HS.

At the heat sealing station HS, as will appear more fully later on, heat is applied to both surfaces of the blank and along one side 7 and along the bottom edge 8, generally in the shaded area of the blank shown in FIGURE 4. This heat is applied in two stages: the first, when the blank is at position A (FIGURE 1), and the second state of heat is applied at position C.

The blank is coated on one side, later to become the inside of the cup, with polyethylene, for example. A thickness of poly of 10.8 pounds per ream of paper has been found highly satisfactory under circumstances to be further described and produces a coating thickness of .00075 of an inch.

Before describing the apparatus and method of the present invention in detail, it may be well to mention, for an overall brief understanding of the sequence of operations on the cup blank being formed, that after one side edge and the bottom edge are heated properly in two stages at station HS, the table then rotates the blank to the wrapping station W where a mandrel M on a rotatable turret (not shown) is waiting. The blank is then wrapped around both the mandrel M and previously formed cup bottom 11 which is held by vacuum on the mandrel. The wrapping mechanism (not shown) is fully described in U.S. Patent No. 2,942,530, issued June 28, 1960, to Bodendoerfer and assigned to an assignee common to the present application. It is believed sufficient to say for purposes of this disclosure that after the side edges 7 and 12 (FIGURE 4) of the blank are wrapped tightly around the mandrel M, a pressure bar 13 comes down and tightly presses and holds the overlapped side seam together as the turret continues to rotate and until the poly has set.

Subsequent operations then fold the bottom edge of the side wall inwardly around the axially extending flange 14 of the cup bottom, and this folded joint is then smoothly finished in the known manner by expanders and smoothing rollers, or the like, such as are shown in U.S. Patent Number 2,942,531, issued June 28, 1960, to Loeser et al.

Referring once again to the details and operation of the heat sealing station HS, a stationary lower heating assembly L is provided for both areas 7 and 8 of the blank, and a complementary, upper heating assembly U is vertically reciprocal between a raised position as shown in FIGURE 1, and a lower, heat applying position where it presses the blank against the lower heating assembly L, as will now more fully appear.

The pattern for the upper and lower heating elements is the same for positions A and C of the heat applying station HS. The blank is first heated along the side and bottom at position A and the blank then moved to position C where it is heated again in the same two areas.

The lower, stationary heating elements include an arcuate rim 20 closely adjacent which the table T rotates to present the bottom edge of the blank directly over rim 20. A series of electric cartridge heaters 21 are located in the vertical wall 22 which is integral with rim 20. These cartridges, as well as others to be referred to, are controlled by a variable voltage transformer (not shown). Rim 20 thus serves to heat the bottom edge of the blanks at both positions A and C. Radially extending from rim 20 are the lower heating members 23 and 24 for position A and members 25 and 26 for position C. These horizontal members lie directly under both sides edges of the blank and thus heat the lower or outer surface of the blank. Electric heating cartridges 26a extend horizontally into these members for heating thereof. Thus, rim 20 and radially extending members 23 to 26 form two distinct lower patterns for receiving the blanks.

A horizontal plate 27 extends between the heating elements at positions A and C, respectively, to firmly support the blanks thereon.

As shown clearly in FIGURES 3, 6 and 12 vertical bolt means 28 provide for accurate vertical adjustment of the lower heating surfaces. A lower support member 28a and legs 29 support the lower heating assembly on the base 30 of the machine.

The upper heater assembly U is mounted by its plate 32 to a vertically reciprocal plate 33 by cap bolts 34. Telescoping guide elements 35 and 36 connect the plate 33 to a stationary frame 37 secured to base 30 (FIGURE 12) so that the plate is a guide for smooth and rapid vertical movement between a lower heat applying position and the upper position as shown in FIGURE 1. The means for vertically shifting the upper heater assembly U is shown in FIGURES 1, 9, 11, 12 and 13 and includes a pivot bar 38 pivoted at one end with the plate 33 as at 39, at the other end with the stationary frame 37 as at 40, (FIGURES 11, 12) and intermediate its length at 42 with a vertical thrust rod 43.

The rod 43 is vertically shifted by a pivot link 44 which is pivotally connected intermediate its length as at 45 to a fixed support 45a, and at one end to rod 43 as at 46, and then at its other end by a crank 47 to eccentric 48 formed on drive shaft 49. Shaft 49 is suitably journalled on a rigid member 50 attached to the machine proper.

The drive shaft 40 is driven in a conventional manner and in timed relationship with rotation of table T so that the upper hearing assembly U comes down on any one blank when it is first at position A and then again after that blank has been shifted by the table to position C. The length of time the heating elements are clamped on the blank at each position is a fraction of a second, for example, about one-fourth of a second for the poly thickness previously referred to. At this speed, the present invention has very satisfactorily produced cups at the rate of 110 per minute.

If heavier paper is used with the present invention, it may be desirable to have three heating stages.

Referring now in greater detail to the upper heater assembly U, the plate 32 has four heater mounting brackets 51–54 secured to and extending downwardly from its lower surface. These brackets are bifurcated so that brackets 51 and 52 can slidingly receive the side seam heaters 55 and 56, and brackets 53 and 54 likewise accommodate the cup bottom seam heaters 57 and 58.

Electric heater cartridges 59 are inserted in each of the heaters 55–58 inclusive for heating the latter.

The heaters have a pin 60 extending crosswise which fits in the vertical slots 61 of the brackets. Thus, the heaters are flexibly mounted within limits so as to set firmly on the blank due to their own weight, urging the blank against the lower heater assembly when the upper assembly is moved downwardly by the pivoted link arrangement previously described. The slots in the brackets minimize dissipation of heat from the bar.

A resilient cushion safety device is provided in thrust rod 43 in the form of a pair of resilient and extensible spring struts 62, 63 (FIGURE 12) acting between rod 43 proper and the rod end 43a through sleeve 43b which is welded at one end to the rod 43 proper as at 43d and at the other end to the separate rod end 43a as at 43e. This device acts to prevent damage to the unit or to an operator if a foreign object such as an operator's hand, gets in the way. The lower heater elements are vertically adjustable by bolt means 28, previously described, so as to also insure proper clamping pressure of the opposed heater elements.

The lower heater elements 24 and 26 have opposed spring biased, hold down bars 66 (FIGURE 7) which acts to hold the blank against heaters 24 and 26. This insures adequate heating of what will be the outside surface of the blank adjacent edge 12, which surface will later abut against the heated poly surface at the other side edge 7 of the blank, when the blank is wrapped around the mandrel M at the next station.

It will be noted that the bottom surface of the upper heaters 57 and 58 are curved as at 57a and 58a, respectively, to form a precise heat pattern which coincides with the flange of the cup bottom when wrapped therearound.

The heaters are made of cast iron, and their surfaces which actually engage the blank are highly polished to about a number 16 microfinish. These surfaces are cured, before use, so as to help prevent the poly from sticking to them and to prevent them from "picking off" the ink, when the blank is pre-printed. This curing of the polished surfaces includes coating them with Teflon which rapidly wears off after a few hours of operation. Nevertheless, it is not necessary to again coat them with Teflon, but instead, it has been found that once they have been so treated, they will not "stick." The invention has been shown and described by having the blank moved by a rotating table, but of course the blank could be transferred from station to station by other means and with a straight line movement.

Various modes of carrying out the invention are contemplated as being within the scope of the following claims particularly pointing out and distinctly claiming the subject matter which is regarded as the invention.

I claim:
1. Blank heating mechanism for heating a side wall blank for a two-piece, flat-bottom paper cup prior to wrapping of the blank, said side wall blank being coated with polyethylene and having a side seam edge and a cup bottom edge, said mechanism comprising upper and lower heating elements, and means for causing relative movement between said elements between a position in which the upper and lower elements are separated for the entry of a flat blank therebetween and a position in which the elements clampingly engage said blank edges therebetween for heating both surfaces thereof.

2. Mechanism as defined in claim 1 further characterized in that there are two separate sets of upper and lower heating elements for heating any one blank in two stages prior to wrapping.

3. Mechanism as described in claim 1 further characterized in that said lower elements are stationary, and including shiftable means for shifting said upper elements between said positions.

4. Mechanism as defined in claim 3 including adjustable means for adjusting the vertical position of said lower elements, and resilient cushion means connected with said shiftable means for resiliently urging said upper heating elements against said blank and lower heating elements with predetermined pressure.

5. Blank heating mechanism for heating a side wall blank for a two-piece, flat-bottom paper cup prior to wrapping of the blank, said side wall blank being coated with polyethylene and having a side seam edge and a cup bottom edge, said mechanism comprising two separate sets of upper and lower heating elements for heating said blank in two separate stages prior to wrapping, shiftable means for causing vertical movement of said upper elements between an upper position in which the upper and lower elements are separated for the entry of a flat blank therebetween and a lower position in which the elements clampingly engage said blank edges therebetween for heating both surfaces thereof, and resilient means connected with said shiftable means for resiliently urging said upper heating elements against said blank on the lower elements with predetermined pressure.

6. Mechanism for heating a side wall blank for a two-piece, flat-bottom paper cup prior to wrapping of the blank around a forming mandrel, said blank being of the type which is coated with heat sealable material and having a side seam edge and a cup bottom edge, said mechanism including an intermittently rotatable table having releasable gripping means for holding said blanks around the periphery thereof and ultimately presenting the blanks to a wrapping mandrel, a blank heating station located ahead of said mandrel and adapted to have blanks presented to it by said table for applying heat to said blanks along said edges thereof, said heating station including upper and lower heating elements, and means for causing relative movement between said upper and lower elements to provide a separated position and a clamping position, whereby said table presents a blank between said elements when the latter are separated and they then clampingly engage said blank to heat the edges thereof prior to the blank being presented by the table to the mandrel for wrapping.

7. Mechanism as defined in claim 6 further characterized in that said heating station includes two sets of upper and lower heating elements, which sets are circumferentially spaced from one another in respect to rotation of said table, each blank being presented to each set for heating said blank in two separate stages prior to wrapping thereof.

8. Mechanism as set forth in claim 6 further characterized in that said lower heating elements are stationary and are located in general horizontal alignment with said table, and shiftable means for vertically shifting said upper elements between said positions in timed relationship with table rotation.

9. Mechanism as defined in claim 8 including adjustable means for adjusting the vertical position of said lower elements, and resilient cushion means connected with said shiftable means for resiliently urging said upper heating elements against said blank and lower heating elements with predetermined pressure.

10. Mechanism for heating a side wall blank for a two-piece, flat-bottom paper cup prior to wrapping of the blank around a forming mandrel, said blank being of the type which is coated with heat sealable material and having side seam edge and a cup bottom edge, said mechanism including an intermittently rotatable table having releasable gripping means for holding said blanks around the periphery thereof and ultimately presenting the blanks to a wrapping mandrel, a blank heating station located ahead of said mandrel and adapted to have blanks presented to it by said table for applying heat to said blanks along said edges thereof, said heating station including two sets of upper and lower heating elements, which sets are circumferentially spaced from one another in respect to rotation of said table, each blank being presented to each set for heating said blank in two separate stages prior to wrapping thereof, shiftable means for causing vertical movement of said upper elements to provide a separated position and a clamping position between upper and lower elements in timed relation with table rotation, whereby said table presents a blank between said elements when the latter are separated and they then clampingly engage said blank to heat the edges thereof prior to the blank being presented by the table to the mandrel for wrapping, adjustable means for adjusting the vertical position of said lower elements, and resilient cushion means connected with said shiftable means for resiliently urging said upper heating elements against said blank and lower heating elements with predetermined pressure.

11. The method of forming a two-piece, flat-bottom paper cup from a polyethylene-coated flat paper blank and a circular cup bottom having a flange, said blank having two side edges and a bottom edge therebetween, said method comprising, heating said blank along one of said side edges and along an area adjacent said bottom edge while the blank is flat, said heating of said blank being done in two separate stages and by moving the blank between said stages, wrapping said blank into a generally circular form and around said bottom, and pressing said side edges together whereby the heated side edges seal together and said heated area adjacent said bottom edge seals with said cup bottom flange.

12. The method of forming a two-piece, flat-bottom paper cup from a polyethylene-coated flat paper blank and a circular cup bottom having a flange, said blank having two side edges and a bottom edge therebetween, said method comprising, heating said blank along one of said side edges and along an area adjacent said bottom edge while the blank is flat, moving said blank and then again heating said side edge and said area, said heating being done on both surfaces of said blank, wrapping said blank into a generally circular form and around said bottom, and pressing said side edges together whereby the heated side edges seal together and said heated area adjacent said bottom edge seals with said cup bottom flange.

13. The method of forming a two-piece, flat-bottom paper cup from a polyethylene-coated flat paper blank and a circular cup bottom having a flange, said blank having two side edges and a bottom edge therebetween, said method comprising, heating said blank along one of said side edges and along an area adjacent said bottom edge while the blank is flat, said heating of said blank being done in two separate stages and by moving the blank between said stages, said heating being done in a range of 350 to 600 degrees Fahrenheit and for a total heating time of about one-half second and on a paper blank having a polyethylene coating thickness of approximately .00075 inch, wrapping said blank into a generally circular form and around said bottom, and pressing said side edges together whereby the heated side edges seal together and said heated area adjacent said bottom edge seals with said cup bottom flange.

14. The method of forming a two-piece, flat-bottom paper cup from a polyethylene-coated flat paper blank and a circular cup bottom having a flange, said blank having two side edges and a bottom edge therebetween, said method comprising, heating said blank along one of said side edges and along an area adjacent said bottom edge while the blank is flat, moving said blank and then again heating said side edge and said area, said heating being done on both surfaces of said blank, said heating being done in a range of 350 to 600 degrees Fahrenheit and for a total heating time of about one-half second and on a paper blank having a polyethylene coating thickness of approximately .00075 inch, wrapping said blank into a generally circular form and around said bottom, and pressing said side edges together whereby the heated side edges seal together and said heated area adjacent said bottom edge seals with said cup bottom flange.

References Cited

UNITED STATES PATENTS 2,032,343   3/1936   Arthur _____ 93—36

GERALD A. DOST, *Primary Examiner.*